US009268789B1

(12) United States Patent
Swerdlow et al.

(10) Patent No.: US 9,268,789 B1
(45) Date of Patent: Feb. 23, 2016

(54) SYSTEM AND METHODS FOR MANAGING DATA LOCATION

(71) Applicant: Google Inc., Mountain View, CA (US)

(72) Inventors: Andrew Swerdlow, San Francisco, CA (US); Dan Fredinburg, San Francisco, CA (US)

(73) Assignee: GOOGLE INC., Mountain View, CA (US)

(*) Notice: Subject to any disclaimer, the term of this patent is extended or adjusted under 35 U.S.C. 154(b) by 231 days.

(21) Appl. No.: 14/050,715

(22) Filed: Oct. 10, 2013

(51) Int. Cl.
*G06F 17/30* (2006.01)

(52) U.S. Cl.
CPC .... *G06F 17/30194* (2013.01); *G06F 17/30082* (2013.01)

(58) Field of Classification Search
None
See application file for complete search history.

(56) References Cited

U.S. PATENT DOCUMENTS

| 8,336,079 | B2 | 12/2012 | Budko et al. | |
|---|---|---|---|---|
| 8,595,317 | B1* | 11/2013 | Harris et al. | 709/213 |
| 2012/0144448 | A1 | 6/2012 | Gunawardena et al. | |
| 2012/0303999 | A1 | 11/2012 | Calder et al. | |
| 2013/0144978 | A1 | 6/2013 | Jain et al. | |
| 2014/0032314 | A1* | 1/2014 | Gieseke et al. | 705/14.49 |
| 2014/0280570 | A1* | 9/2014 | Sutton et al. | 709/204 |

* cited by examiner

*Primary Examiner* — Hung Q Pham
(74) *Attorney, Agent, or Firm* — Procopio, Cory Hargreaves & Savitch LLP (57) ABSTRACT

Systems and methods for managing data location are described, including determining a content type of user content received from a user via one or more computing devices; storing the user content to a first geographic storage location based on a first target geographic specification provided by the user, if the determined content type matches a first content type associated with the first target geographic specification; and storing the user content to a second geographic storage location based on a second target geographic specification provided by the user, if the determined content type matches a second content type associated with the second target geographic specification.

14 Claims, 9 Drawing Sheets

SYSTEM AND METHODS FOR MANAGING DATA LOCATION

BACKGROUND

1. Field

Aspects of the example implementations relate to providing controls for managing geographical storage location of user-associated data or content, and more specifically, use of user specifications to determine a geographical storage location of data associated with the user.

2. Related Art

Cloud computing offers a number of potential benefits by allowing data and content to be copied, transferred, stored, and accessed from almost any location in the world. However, some countries, governments, or corporations might have laws, rules or policies granting jurisdiction over data or content stored in data centers within their borders. For example, a country may access data stored within its borders and permit the prosecution of a user based on the content or data. Thus, a user may be subjected to risk because their data or content is stored in a data center in that foreign country.

SUMMARY

The subject matter discussed herein relates generally to online services and, more particularly, to managing storage locations of user-associated content or data.

According to an aspect, a computer-implemented method for determining a geographic location to store user content is provided, including determining a content type of user content received from a user via one or more computing devices; storing the user content to a first geographic storage location based on a first target geographic specification provided by the user, based on the determined content type matching a first content type associated with the first target geographic specification; and storing the user content to a second geographic storage location based on a second target geographic specification provided by the user, based on the determined content type matching a second content type associated with the second target geographic specification.

According to another aspect, a computer-implemented method for determining a geographic storage location to store previously stored user content is provided, including determining a content type and a current storage location of user content previously stored via one or more computing devices; storing the user content to a first geographic storage location based on a first target geographic specification provided by the user, based on the determined content type matching a first content type associated with the first target geographic specification; and storing the user content to a second geographic storage location based on a second target geographic specification provided by the user, based on the determined content type matching a second content type associated with the second target geographic specification.

According to yet another aspect, a non-transitory computer readable medium having stored therein computer executable instructions for determining a content type of user content received from a user via one or more computing devices; storing the user content to a first geographic storage location based on a first target geographic specification provided by the user, if the determined content type matches a first content type associated with the first target geographic specification; and storing the user content to a second geographic storage location based on a second target geographic specification provided by the user, based on the determined content type matching a second content type associated with the second target geographic specification is provided.

According to yet another aspect, a non-transitory computer readable medium having stored therein computer executable instructions for determining a content type and a current storage location of user content previously stored via one or more computing devices; storing the user content to a first geographic storage location based on a first target geographic specification provided by the user, based on the determined content type matching a first content type associated with the first target geographic specification; and storing the user content to a second geographic storage location based on a second target geographic specification provided by the user, based on the determined content type matching a second content type associated with the second target geographic specification is provided.

In addition to a method as described above, the implementations may include a device, a system, and/or a computer-readable medium, but are not limited thereto.

DETAILED DESCRIPTION

The subject matter described herein is taught by way of example implementations. Various details have been omitted for the sake of clarity and to avoid obscuring the subject matter. The examples shown below are directed to structures and functions for implementing managing data location.

Service providers may store a user's data or content to a variety of geographic locations. However, a user may have preferences as to where his or her content may be stored and where his or her content may not be stored. In some example implementations, service providers may provide mechanisms to allow a user to specify areas, regions, or locations where the user's content or data can or cannot be stored. For example, a mechanism may be implemented to allow User A to specify that User A's content can only be stored in data centers located within country X (i.e. User A may create "whitelist" allowing storage of content within Country X). In some example implementations, User A may alternatively or additionally specify that User A's content cannot be stored in data centers located within Country Y (i.e. User A may create a "blacklist" preventing storage of content within Country Y).

In some example implementations, a user may be given the ability to specify different storage locations where data or content may be stored based on the type of content to be stored. For example, a User A may specify that the blog posts cannot be stored in data centers located within Country X and further specify that emails can be stored in data centers located within Country X. Additionally, in some example implementations, a user may also specify a duration of time for storage location specifications are to be applied or to specify a specific date or time when the storage location specifications should expire. For example, User A may specify that User A's content cannot be stored in Country X for 90 days, or until after 9:30 on Nov. 1, 2013.

As used herein, a service provider may be any entity that stores user accounts and/or data or is likely implementing similar services. For example, cloud based service providers (e.g., providing computing and/or storage or service) may implement at least some of the example implementations described herein to allow users to control storage location of data associated with their accounts and content.

As used herein, the terms "account," "data" associated with an account, or "content" associated with an account refer to information and data of or about the user, related to or associated with the user, generated by or for the user, and/or for communicating with or providing service to the user. An account and/or data or content associated with the account may be associated with a website, product, service, online service, or application. The term "application" includes, but is not limited to, software (e.g., a non-transitory computer readable medium having instructions executable by a processor), which is online (e.g., accessible by communication protocol and structure, such as the Internet or other communication network). The application may be embodied in the structure described below with respect to FIG. 8 below.

As used herein, the term "website" or "web site" or "site" refers to a set of web pages for providing or supporting related services. A website can be hosted on at least one computing device (e.g., a system, server, web server, application server, client, or any label) accessible via a network or connection (wired and/or wireless). A website can be accessed and/or supported using at least one top-level Uniform Resource Locator (URL, e.g., "abc.gov," "123.org," "zxc.com," "bestads.com," "virtualbank.com," and the like). A website can be operated and/or supported by one or more business entities. For example, ZXC Corporation may operate the website "zxc.com" that includes web pages, content, and/or services from "zxc.bestads.com" (e.g., advertisement services provided by another firm) and "virtualbank.com/zxc-payment-services" (e.g., financial services provided by a financial institution).

As used herein, the terms "product," "service," "online service," or "application" refer to any information, communication, infrastructure, organization, or the like provided by one or more providers to at least one user. Examples of products, services, or applications may include, but are not limited to, forums, online platforms, bulletin boards, social networks, websites, sites, chat rooms, email communication, image sharing sites, data sharing platforms, video sharing sites, online searching, data storage, cloud storage, software, tax preparation and filing, online banking, online investment management, and the like. Products, services, or applications may be provided on any device ranging from a mobile device (e.g., smartphone application or "apps"), to a semi-mobile device (e.g., a laptop), and to a non-mobile device (e.g., a kiosk). A product, service, or application may communicate to a provider or another product, service, or application using a wired or wireless connection.

Figure 1:
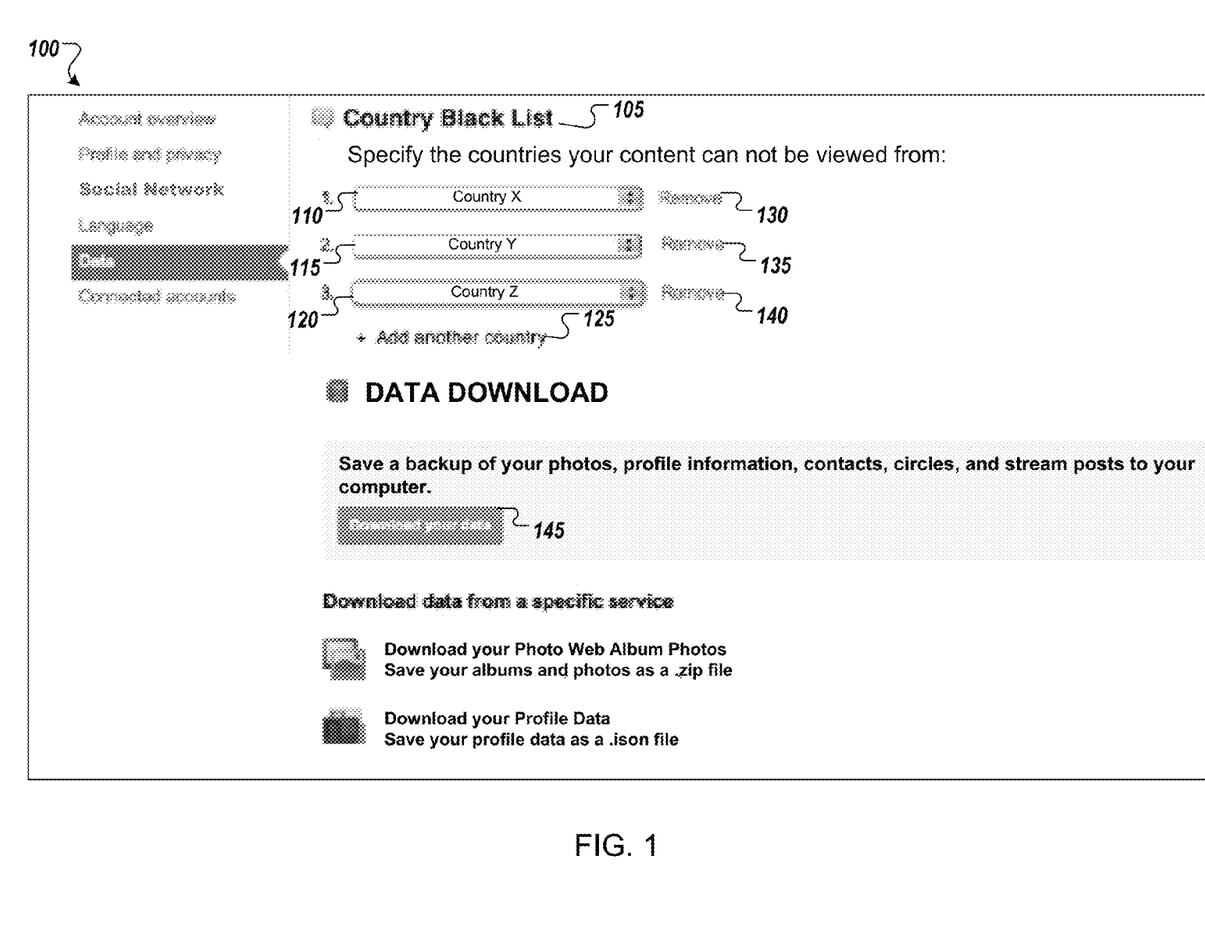
FIG. 1 illustrates an example user interface, in accordance with an example implementation.

FIG. 1 illustrates an example user interface, in accordance with an example implementation. User interface (UI) 100 is used to illustrate a mechanism for a user to provide a specification including a geographic location to be used to control storage location of a user's data or content. Specifically, UI 100 provides one or more options 110, 115, 120 for the user to specify geographic locations to be used as a basis to control storage locations of the user's data or content. More specifically, options 110, 115, 120 each provide a drop down menu from which a user may select a country to specify. In this example implementation, with the permission of the user, the service provider may use the user-specified country to block storing and/or processing in data centers located in the country specified. For example, but not by way of limitation, in the example implementation illustrated in FIG. 1, the user has specified that content should not be stored (or viewed from) in data centers located within Country X at control 110, in data centers located within Country Y at control 115, and in data centers located within Country Z at control 120.

Additionally, in some implementations, the UI 100 may also provide user interface objects 125, 130, 135, 140 such as links, to add additional options to the UI 100 or remove the controls 110, 115, 120 so that a user may specify additional countries or remove previously specified countries. For example, but not by way of limitation, a user may specify an additional country or countries via object 125. Previously selected countries may be removed by the user via objects 130, 135, 140.

Additionally, in some example implementations, the UI 100 may also provide a button 145 to allow a user to download all data and content associated with an account. The data or content to be downloaded may include, but is not limited to, photos and photo albums, profile data, contacts, public or private social groups, and stream posts.

In this implementation, the user may specify countries where data or content cannot be stored. However, other implementations may allow the user to specify only countries where data or content may be stored. Further, in addition to country specifications, other implementations may allow the user to specify postal codes, cities, states, provinces, regions, or any other geographical unit that may be apparent to person of ordinary skill in the art.

Service providers may also comply with restrictions or limitations on storage locations imposed by laws, rules, or policies that may apply to data or content generated by users located within a particular jurisdiction. For example, if the laws of Country X prohibit data or content generated by the residents of Country X from being stored in data centers located within Country Y, a service provider may comply with the law and block storage in Country Y of data or content generated by all users who are reside in Country X, even if some users have specified that their data or content should only be stored in Country Y. In other words, the service provider can comply with the laws of Country X. In such a situation, the service provider may send users a warning message when their specified storage location that appears to conflict with a law of Country X, so as to protect the user from inadvertently storing data in a manner that is inconsistent with the law of Country X.

Figure 2:
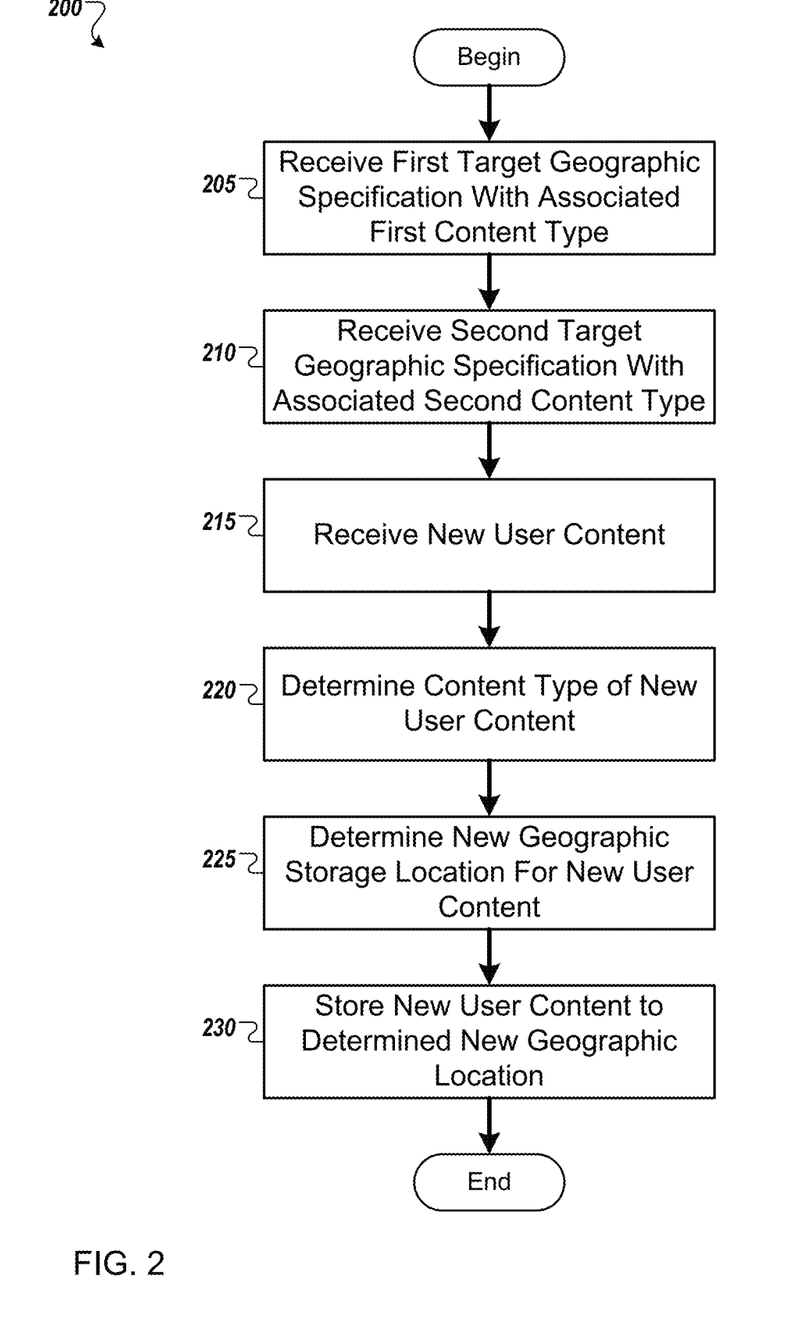
FIGS. 2-7 illustrate example process flows, in accordance with one or more example implementation.

FIG. 2 shows a flowchart of an example process (process 200) according to at least one example implementation under the control of the user. In operation 205, the service provider receives the first target geographic specification, which includes the first target geographic location information, and a first content type associated with the first target geographic specification from a user. For example, the user may use UI 100 to provide the first specification to the user. The first specification may also contain additional information or data, such as a duration of time for the first specified geographic location to be used or a specified time for the first geographic location to expire. It should be noted that the user may optionally decide to provide a first specification at operation 205, or not provide a first specification at operation 205.

Similarly, in operation 210, the service provider receives the second target geographic specification, which includes the second target geographic location information, and a second content type associated with the second target geographic specification from a user. Again, the user may, for example, use a UI such as UI 100 to provide the second specification to the user. Further, the second specification may also contain additional information or data, such as a duration of time for the second specified geographic location to be used or a specified time for the second geographic location to expire. It should be noted that the user may optionally decide to provide a second specification at operation 210, or not provide a second specification at operation 210.

In operation 215, the service provider receives content from a user. The content received from the user can include text data, image data, video data, or any other data that they would like to publish or distribute to other users, or date the user would like to save for later use. The content may be an email, website post, social media post, blog entry, picture, video, document or any other form of content as would be apparent to a person of ordinary skill in the art. The content may be received by email, FTP transfer, website upload, or by any other form of data transfer as would be apparent to a person of ordinary skill in the art.

In operation 220, the content type of the received content is determined. The content type may be determined by analyzing metadata or embedded data associated with the content. The content type may also be determined by analyzing the file type or file extension associated with the file name. The content type may also be determined by any other method as would be apparent to a person of ordinary skill in the art.

In operation 225, a geographic storage location for the user content is determined based on the content type of the user content and the first and second target geographic specifications received from the user. Example implementations of a determination of a geographic storage location in operation 225 are discussed in greater detail below with respect to FIGS. 4 and 5. Further, once a geographic storage location is determined in operation 225, the user content is stored to the determined geographic location in operation 230 and the process 200 terminates.

In some example embodiments, user content may be stored to a geographic location matching the first target geographic specification if the content type of the user content matches the first content type associated with the first target geographic specification (e.g., a "whitelist" embodiment). Further, user content may be stored to a geographic location matching the second target geographic specification if the content type of the user content matches the second content type associated with the second target geographic specification (i.e. a "whitelist" embodiment).

For example, if User A provides a specification containing the first geographic location "Country X" for emails (first associated content type) and the second geographic location "Country Y" for videos (second associated content type), received user content that is an email is stored in "Country X" and received user content that is a video is stored in "Country Y".

However, in some example embodiments, user content may be stored to a geographic location different from the first target geographic specification if the content type of the user content matches the first content type associated with the first target geographic specification (i.e. a "blacklist" embodiment). Further, user content may be stored to a geographic location different from the second target geographic specification if the content type of the user content matches the second content type associated with the second target geographic specification (i.e. a "blacklist" embodiment).

For example, if User A provides a specification containing the first geographic location "Country X" for emails (first associated content type) and the second geographic location "Country Y" for videos (second associated content type), received user content that is an email is stored in geographic locations other than "Country X" and received user content that is a video is stored in geographic locations other than "Country Y".

Figure 3:
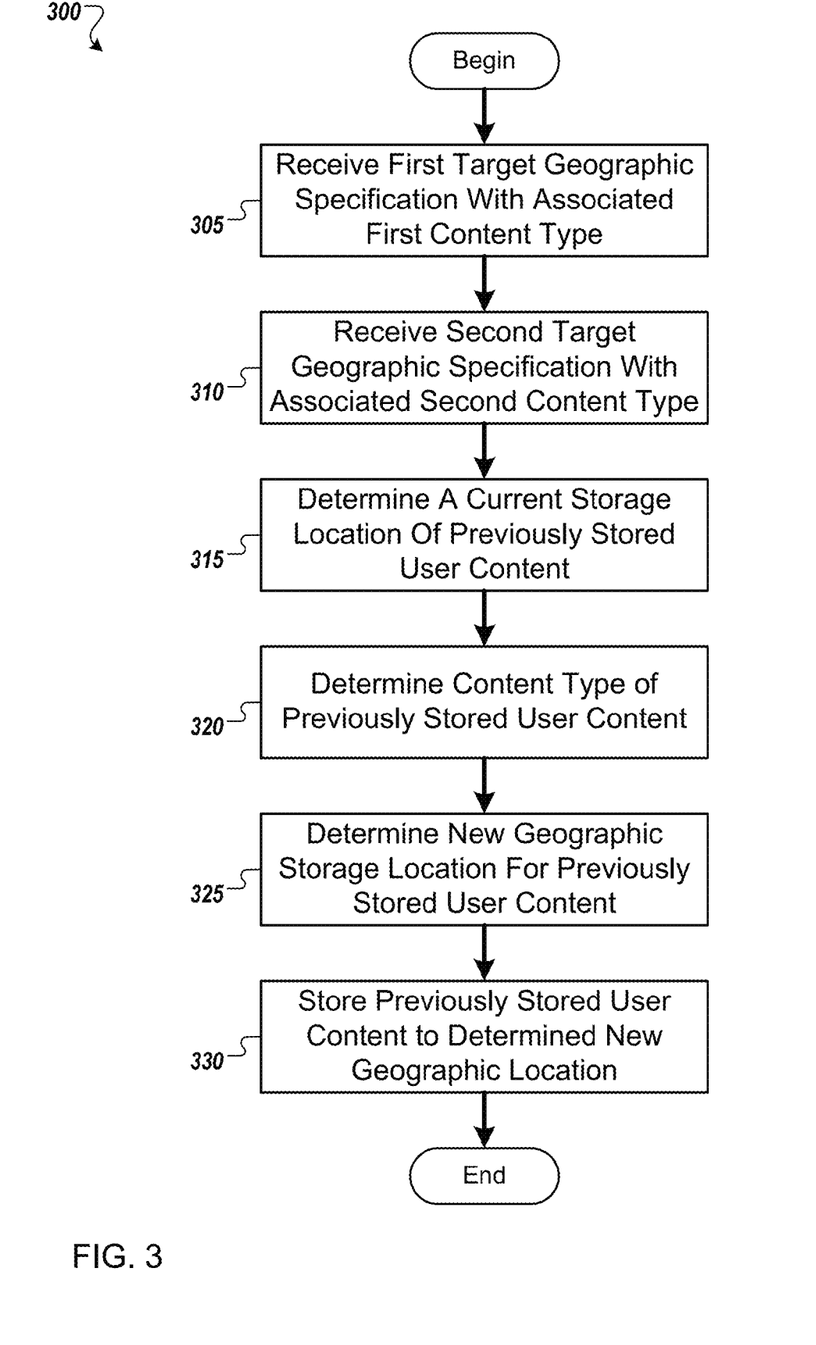

FIG. 3 shows a flowchart of an example process (process 300) according to at least one example implementation. In operation 305, the service provider receives the first target geographic specification, which includes the first target geographic location information, and a first content type associated with the first target geographic specification from a user. For example, the user may use a UI such as UI 100 to provide the first specification to the user. The first specification may also contain additional information or data, such as a duration of time for the first specified geographic location to be used or a specified time for the first geographic location to expire. It should be noted that the user may optionally decide to provide a first specification at operation 305, or not provide a first specification at operation 305.

Similarly, in operation 310, the service provider receives the second target geographic specification, which includes the second target geographic location information, and a second content type associated with the second target geographic specification from a user. Again, the user may, for example, use a UI such as UI 100 to provide the second specification to the user. Further, the second specification may also contain additional information or data, such as a duration of time for the second specified geographic location to be used or a specified time for the second geographic location to expire. It should be noted that the user may optionally decide to provide a second specification at operation 310, or not provide a second specification at operation 310.

In operation 315, the service provided determines a current storage location of previously stored user content. The previously stored user content may have been stored in a location based on previous specifications received by the user, or may have been stored based on direct instructions from the user or some other entity. The current storage location may be determined based on the metadata associated with the user content, or by any other method as may be apparent to a person of ordinary skill in the art.

In operation 320, the content type of the received content is determined. The content type may be determined by analyzing metadata or embedded data associated with the content. The content type may also be determined by analyzing the file type or file extension associated with the file name. The content type may also be determined by any other method as would be apparent to a person of ordinary skill in the art.

In operation 325, a new geographic storage location for the user content is determined based on the content type of the user content, the current storage location of the user content and the first and second target geographic specifications received from the user. Example implementations of a determination of a geographic storage location in operation 325 are discussed in greater detail below with respect to FIGS. 6 and 7. Further, once a geographic storage location is determined in operation 325, the user content is stored to the determined geographic location in operation 330 and the process 300 terminates.

In some example embodiments, user content may be stored to a new geographic location matching the first target geographic specification if the content type of the user content matches the first content type associated with the first target geographic specification (i.e. a "whitelist" embodiment) and the current storage location does not match the first target specification. Further, user content may be stored to a new geographic location matching the second target geographic specification if the content type of the user content matches the second content type associated with the second target geographic specification (e.g., a "whitelist" embodiment) and the current storage location does not match the second target specification.

For example, if User A provides a specification containing the first geographic location "Country X" for emails (first associated content type) and the second geographic location "Country Y" for videos (second associated content type), received user content that is an email is stored in "Country X" and received user content that is a video is stored in "Country Y".

However, in some example embodiments, user content may be stored to a new geographic location different from the first target geographic specification if the content type of the user content matches the first content type associated with the first target geographic specification (i.e. a "blacklist" embodiment) and the current storage location matches the first target specification. Further, user content may be stored to a geographic location different from the second target geographic specification if the content type of the user content matches the second content type associated with the second target geographic specification (i.e. a "blacklist" embodiment) and the current storage location matches the second target specification.

For example, if User A provides a specification containing the first geographic location "Country X" for emails (first associated content type) and the second geographic location "Country Y" for videos (second associated content type), received user content that is an email is stored in geographic locations other than "Country X" and received user content that is a video is stored in geographic locations other than "Country Y".

Figure 4:
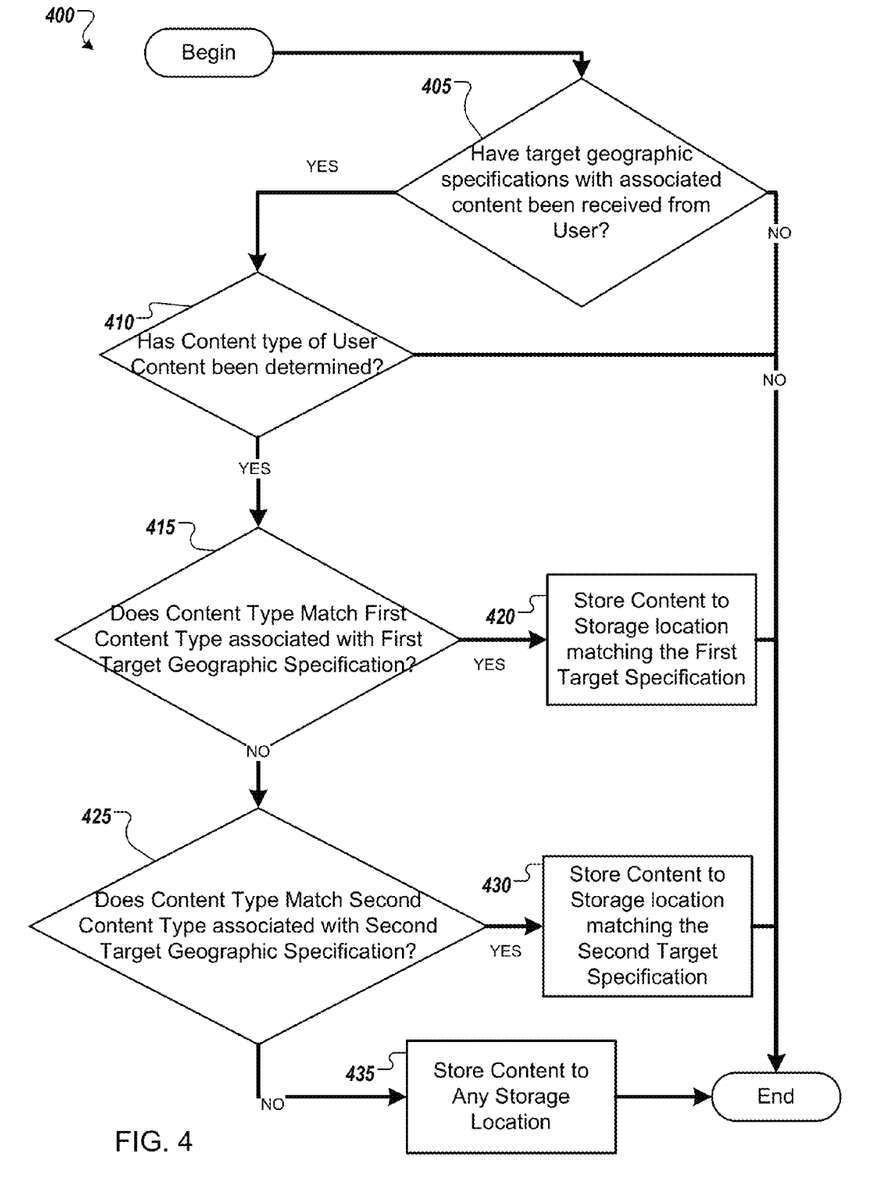

FIG. 4 shows a first implementation 400 of an example process flow for determination of a new geographic storage location and storage processes performed in operations 225 and 230 of FIG. 2. In operation 405 of this example process flow 400, a determination is made whether the user has provided first and/or second target specifications in operations 205 and 210 to determine if the user has specified a target geographic storage locations for their data or content. If no target specifications are determined to have been received (NO), the process flow 400 is terminated. In some example implementations, the workflow may be returned to the process of FIG. 2 to await receipt of target storage location specifications from the user.

If the target specifications are determined to have been received in 405 (YES), the process 400 proceeds to 410. In 410, a determination is made whether the content type of the content or data received from the user in operation 215 as been determined. If it is determined in 410, that the content type of the received user content or data has not or cannot be determined (NO), the process flow 400 is terminated. In some example implementations, the work flow may then be returned to the process of FIG. 2 to await determination of the content type of the user content. In some example implementations, a user may be requested to identify the content type to allow user target specifications to be applied to the content. In other example implementations, the user content may be stored to a default storage location specified by the user.

If it is determined in operation 410 that the content type of the user content has been confirmed (i.e. determined) (YES), the process 400 proceeds to operation 415. In operation 415, the content type of received user content is compared to the content type associated with the first target geographic storage location received from the user to determine if the content types match.

In example process 400, if the content type of the received user content is determined to match the content type associated with the first target geographic storage location (YES) in 415, the content received from the user is stored to a geographic storage location matching the first target geographic storage location in operation 420 and process 400 is terminated. In some example implementations, a record may also be created of where the data or content has been stored in operation 420 to allow a user to later request a list or report of all geographic locations where their data or content has been stored. If such request is received, all records of geographic locations where the user's data or content has been stored may be provided to the user.

If the content type of the received user content is determined to not match the content type associated with the first target geographic storage location (NO) in 415, process 400 continues to operation 425. In operation 425, the content type of received user content is compared to the content type associated with the second target geographic storage location received from the user to determine if the content types match.

In example process 400, if the content type of the received user content is determined to match the content type associated with the second target geographic storage location (YES) in 425, the content received from the user is stored to a geographic storage location matching the second target geographic storage location in operation 430 and process 400 is terminated. Again, in some example implementations, a record may also be created of where the data or content has been stored in operation 430 to allow a user to later request a list or report of all geographic locations where their data or content has been stored. If such request is received, all records of geographic locations where the user's data or content has been stored may be provided to the user.

If the content type of the received user content is determined to not match the content type associated with the second target geographic storage location (NO) in 425, process 400 continues to operation 435. In operation 435, the content or data received from the user is stored to any available storage location because the system has determined that no target geographic specification has been provided by the user for content have a content type matching the content type of the content or data received from the user. In some implementations, the received content may be stored to a default storage location specified by the user, or may be stored to a default storage location selected by the service provider. Once the user content or data is stored to a storage location in operation 435, process 400 is terminated. Again, in some example implementations, a record may also be created of where the data or content has been stored in operation 435 to allow a user to later request a list or report of all geographic locations where their data or content has been stored. If such request is received, all records of geographic locations where the user's data or content has been stored may be provided to the user.

Figure 5:
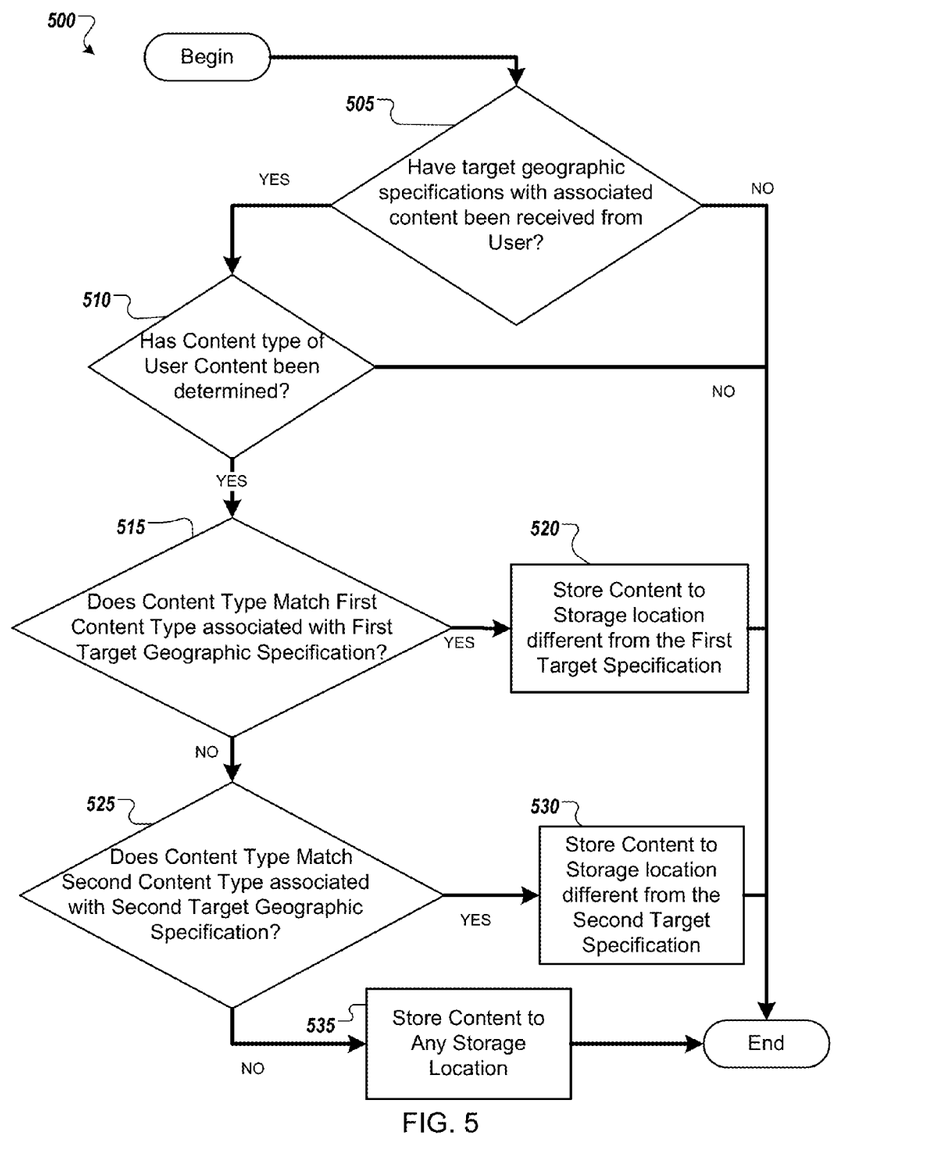

FIG. 5 shows a second implementation 500 of an example process flow for determination of a new geographic storage location and storage processes performed in operations 225 and 230 of FIG. 2. In operation 505 of this example process flow 500, a determination is made whether the user has provided first and/or second target specifications in operations 205 and 210 to determine if the user has specified a target geographic storage locations for their data or content. If no target specifications are determined to have been received (NO), the process flow 500 is terminated. In some example implementations, the workflow may be returned to the process of FIG. 2 to await receipt of target storage location specifications from the user.

If the target specifications are determined to have been received in 505 (YES), the process 500 proceeds to 510. In 510, a determination is made whether the content type of the content or data received from the user in operation 215 as been determined. If it is determined in 510, that the content type of the received user content or data has not or cannot be determined (NO), the process flow 500 is terminated. In some example implementations, the work flow may then be returned to the process of FIG. 2 to await determination of the content type of the user content. In some example implementations, a user may be requested to identify the content type to allow user target specifications to be applied to the content. In other example implementations, the user content may be stored to a default storage location specified by the user.

If it is determined in operation 510 that the content type of the user content has been confirmed (i.e. determined) (YES), the process 500 proceeds to operation 415. In operation 515, the content type of received user content is compared to the content type associated with the first target geographic storage location received from the user to determine if the content types match.

In example process 500, if the content type of the received user content is determined to match the content type associated with the first target geographic storage location (YES) in 515, the content received from the user is stored to any geographic storage location that does not match or is different from the first target geographic storage location in operation 520 and process 500 is terminated. For example, the user content may be stored to a default geographic location specified by the user or by the service provider, or to a randomly selected geographic storage location that does not match the first target geographic location. In some example implementations, a record may also be created of where the data or content has been stored in operation 520 to allow a user to later request a list or report of all geographic locations where their data or content has been stored. If such request is received, all records of geographic locations where the user's data or content has been stored may be provided to the user.

If the content type of the received user content is determined to not match the content type associated with the first target geographic storage location (NO) in 515, process 500 continues to operation 525. In operation 525, the content type of received user content is compared to the content type associated with the second target geographic storage location received from the user to determine if the content types match.

In example process 500, if the content type of the received user content is determined to match the content type associated with the second target geographic storage location (YES) in 515, the content received from the user is stored to any geographic storage location that does not match or is different from the second target geographic storage location in operation 530 and process 500 is terminated. For example, the user content may be stored to a default geographic location specified by the user or by the service provider, or to a randomly selected geographic storage location that does not match the second target geographic location. In some example implementations, a record may also be created of where the data or content has been stored in operation 530 to allow a user to later request a list or report of all geographic locations where their data or content has been stored. If such request is received, all records of geographic locations where the user's data or content has been stored may be provided to the user.

If the content type of the received user content is determined to not match the content type associated with the second target geographic storage location (NO) in 525, process 500 continues to operation 535. In operation 535, the content or data received from the user is stored to any available storage location because the system has determined that no target geographic specification has been provided by the user for content have a content type matching the content type of the content or data received from the user. In some implementations, the received content may be stored to a default storage location specified by the user, or may be stored to a default storage location selected by the service provider. Once the user content or data is stored to a storage location in operation 535, process 500 is terminated. Again, in some example implementations, a record may also be created of where the data or content has been stored in operation 535 to allow a user to later request a list or report of all geographic locations where their data or content has been stored. If such request is received, all records of geographic locations where the user's data or content has been stored may be provided to the user.

Figure 6:
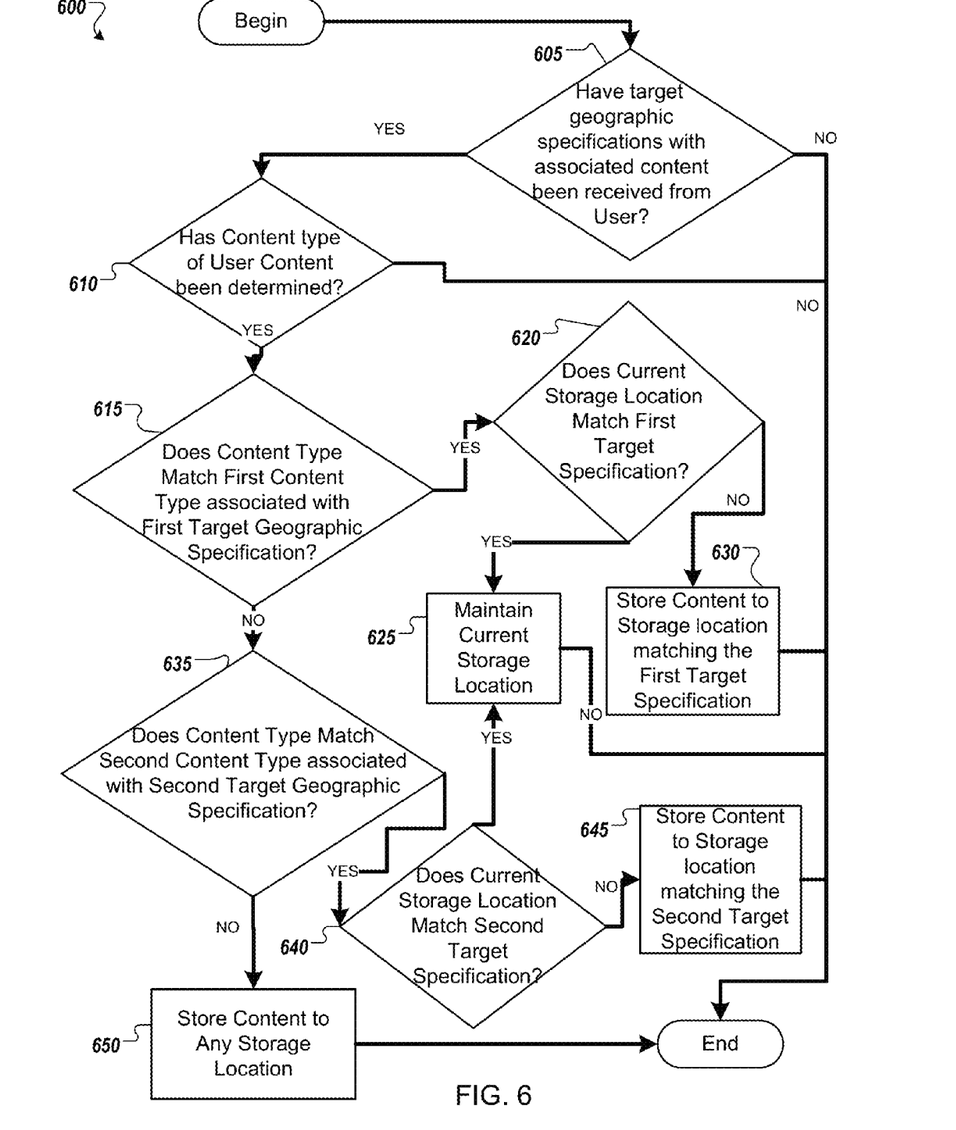

FIG. 6 shows a first implementation 600 of an example process flow for determination of a new geographic storage location and storage processes performed in operations 325 and 330 of FIG. 3. In operation 605 of this example process flow 600, a determination is made whether the user has provided first and/or second target specifications in operations 305 and 310 to determine if the user has specified a target geographic storage locations for their data or content. If no target specifications are determined to have been received (NO), the process flow 600 is terminated. In some example implementations, the workflow may be returned to the process of FIG. 3 to await receipt of target storage location specifications from the user.

If the target specifications are determined to have been received in 605 (YES), the process 600 proceeds to 610. In 610, a determination is made whether the content type of the content or data previously stored as been determined. If it is determined in 610, that the content type of the previously stored user content or data has not or cannot be determined (NO), the process flow 600 is terminated. In some example implementations, the work flow may then be returned to the process of FIG. 3 to await determination of the content type of the user content. In some example implementations, a user may be requested to identify the content type to allow user target specifications to be applied to the content. In other example implementations, the user content may be stored to a default storage location specified by the user.

If it is determined in operation 610 that the content type of the user content has been confirmed (i.e. determined) (YES), the process 600 proceeds to operation 615. In operation 615, the content type of the previously stored user content is compared to the content type associated with the first target geographic storage location specification received from the user to determine if the content types match.

In example process 600, if the content type of the previously stored user content is determined to match the content type associated with the first target geographic storage location (YES) in 615, the current storage location of the previously stored user content or data determined in operation 315 of process 300 is compared to the first target geographic storage location specification in operation 620 to determine if the current storage location matches the first target geographic storage location specification. If it is determined in 620 that the current storage location matches the first target geographic storage location specification (YES), the current storage location is maintained (i.e. the previously stored user content or data continues to be stored at the current storage location) in operation 625 and process 600 is terminated.

In some example implementations, a record may also be created of where the data or content has been stored in operation 625 to allow a user to later request a list or report of all geographic locations where their data or content has been stored. If such request is received, all records of geographic locations where the user's data or content has been stored may be provided to the user.

If it is determined in 620 that the current storage location does not match the first target geographic storage location specification (NO), the previously stored user content is moved and stored to a new geographic storage location that matches the first target geographic storage location in operation 630 and process 600 is terminated. Again, in some example implementations, a record may also be created of where the data or content has been stored in operation 630 to allow a user to later request a list or report of all geographic locations where their data or content has been stored. If such request is received, all records of geographic locations where the user's data or content has been stored may be provided to the user.

If the content type of the previously stored user content is determined to not match the content type associated with the first target geographic storage location (NO) in 615, process 600 continues to operation 635. In operation 635, the content type of the previously stored user content is compared to the content type associated with the second target geographic storage location received from the user to determine if the content types match.

In example process 600, if the content type of the previously stored user content is determined to match the content type associated with the second target geographic storage location (YES) in 635, the current storage location of the previously stored user content or data determined in operation 315 of process 300 is compared to the second target geographic storage location specification in operation 640 to determine if the current storage location matches the second target geographic storage location specification. If it is determined in 640 that the current storage location matches the second target geographic storage location specification (YES), the current storage location is maintained (i.e. the previously stored user content or data continues to be stored at the current storage location) in operation 625 and process 600 is terminated.

Again, in some example implementations, a record may also be created of where the data or content has been stored in operation 625 to allow a user to later request a list or report of all geographic locations where their data or content has been stored. If such request is received, all records of geographic locations where the user's data or content has been stored may be provided to the user.

If it is determined in 640 that the current storage location does not match the second target geographic storage location specification (NO), the previously stored user content is moved and stored to a new geographic storage location that matches the second target geographic storage location in operation 645 and process 600 is terminated. Again, in some example implementations, a record may also be created of where the data or content has been stored in operation 645 to allow a user to later request a list or report of all geographic locations where their data or content has been stored. If such request is received, all records of geographic locations where the user's data or content has been stored may be provided to the user.

If the content type of the previously stored user content is determined to not match the content type associated with the second target geographic storage location (NO) in 635, process 600 continues to operation 650. In operation 650, the previously stored content or data is moved to any available storage location because the system has determined that no target geographic specification has been provided by the user for content having a content type matching the content type of the content or data previously stored. In some implementations, the received content may be stored to a default storage location specified by the user, or may be stored to a default storage location selected by the service provider. In other embodiments, the current storage location may be maintained and the data or content may not be moved at all. Once the user content or data is stored to a storage location in operation 650, process 600 is terminated.

Again, in some example implementations, a record may also be created of where the data or content has been stored in operation 650 to allow a user to later request a list or report of all geographic locations where their data or content has been stored. If such request is received, all records of geographic locations where the user's data or content has been stored may be provided to the user.

Figure 7:
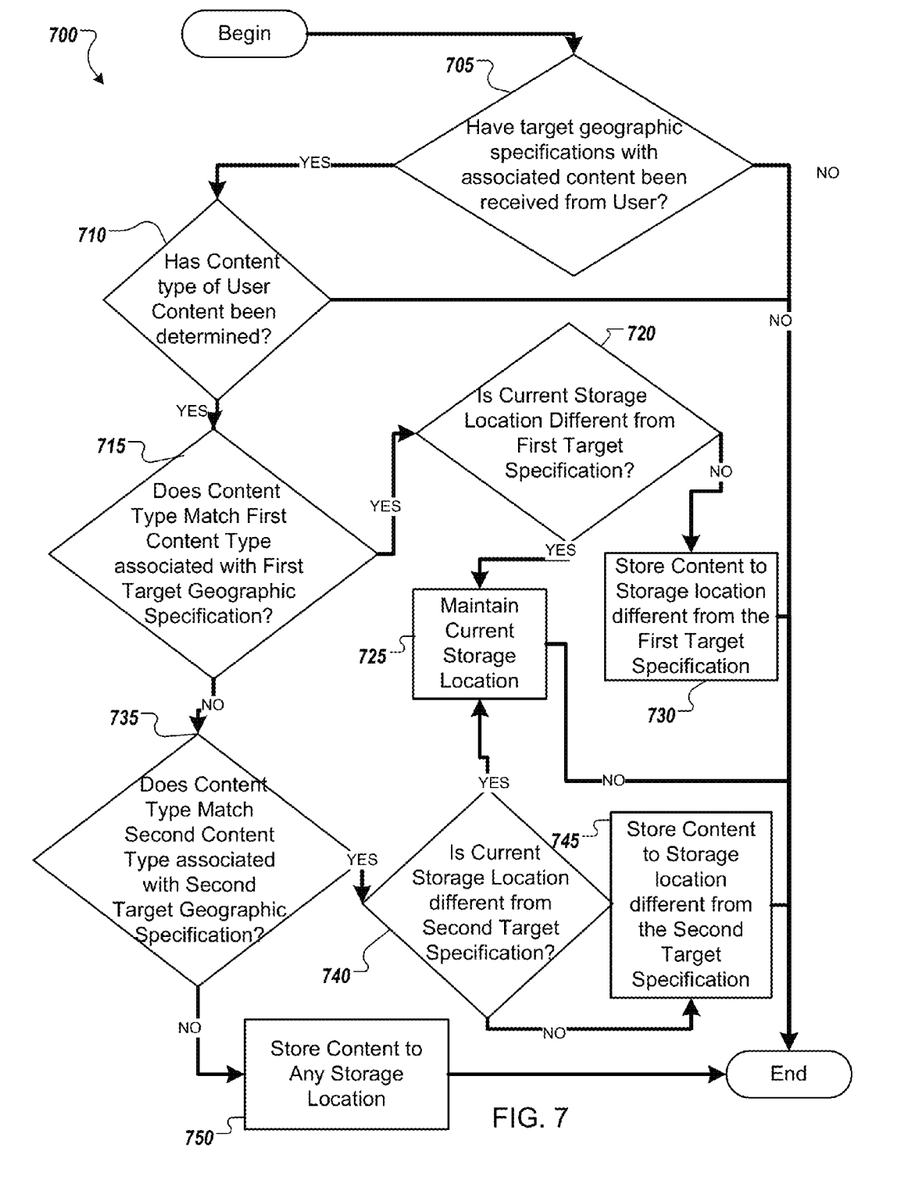

FIG. 7 shows a second implementation 700 of an example process flow for determination of a new geographic storage location and storage processes performed in operations 325 and 330 of FIG. 3. In operation 705 of this example process flow 700, a determination is made whether the user has provided first and/or second target specifications in operations 305 and 310 to determine if the user has specified a target geographic storage locations for their data or content. If no target specifications are determined to have been received (NO), the process flow 700 is terminated. In some example implementations, the workflow may be returned to the process of FIG. 3 to await receipt of target storage location specifications from the user.

If the target specifications are determined to have been received in 705 (YES), the process 700 proceeds to 710. In 710, a determination is made whether the content type of the content or data previously stored as been determined. If it is determined in 710, that the content type of the previously stored user content or data has not or cannot be determined (NO), the process flow 700 is terminated. In some example implementations, the work flow may then be returned to the process of FIG. 3 to await determination of the content type of the user content. In some example implementations, a user may be requested to identify the content type to allow user target specifications to be applied to the content. In other example implementations, the user content may be stored to a default storage location specified by the user.

If it is determined in operation 710 that the content type of the user content has been confirmed (i.e. determined) (YES), the process 700 proceeds to operation 715. In operation 715, the content type of the previously stored user content is compared to the content type associated with the first target geographic storage location specification received from the user to determine if the content types match.

In example process 700, if the content type of the previously stored user content is determined to match the content type associated with the first target geographic storage location (YES) in 715, the current storage location of the previously stored user content or data determined in operation 315 of process 300 is compared to the first target geographic storage location specification in operation 720 to determine if the current storage location is different from the first target geographic storage location specification. If it is determined in 720 that the current storage location is different from the first target geographic storage location specification (YES), the current storage location is maintained (i.e. the previously stored user content or data continues to be stored at the current storage location) in operation 725 and process 700 is terminated. In some example implementations, a record may also be created of where the data or content has been stored in operation 725 to allow a user to later request a list or report of all geographic locations where their data or content has been stored. If such request is received, all records of geographic locations where the user's data or content has been stored may be provided to the user.

If it is determined in 720 that the current storage location is not different (i.e. matches) the first target geographic storage location specification (NO), the previously stored user content is moved and stored to a new geographic storage location that is different from (i.e. does not match) the first target geographic storage location in operation 730 and process 700 is terminated. Again, in some example implementations, a record may also be created of where the data or content has been stored in operation 730 to allow a user to later request a list or report of all geographic locations where their data or content has been stored. If such request is received, all records of geographic locations where the user's data or content has been stored may be provided to the user.

If the content type of the previously stored user content is determined to not match the content type associated with the first target geographic storage location (NO) in 715, process 700 continues to operation 735. In operation 735, the content type of the previously stored user content is compared to the content type associated with the second target geographic storage location received from the user to determine if the content types match.

In example process 700, if the content type of the previously stored user content is determined to match the content type associated with the second target geographic storage location (YES) in 735, the current storage location of the previously stored user content or data determined in operation 315 of process 300 is compared to the second target geographic storage location specification in operation 740 to determine if the current storage location is different from the second target geographic storage location specification. If it is determined in 740 that the current storage location is different from (i.e. does not match) the second target geographic storage location specification (YES), the current storage location is maintained (i.e. the previously stored user content or data continues to be stored at the current storage location) in operation 725 and process 700 is terminated. Again, in some example implementations, a record may also be created of where the data or content has been stored in operation 725 to allow a user to later request a list or report of all geographic locations where their data or content has been stored. If such request is received, all records of geographic locations where the user's data or content has been stored may be provided to the user.

If it is determined in 740 that the current storage location is not different from (i.e. matches) the second target geographic storage location specification (NO), the previously stored user content is moved and stored to a new geographic storage location that is different from (i.e. does not match) the second target geographic storage location in operation 745 and process 700 is terminated. Again, in some example implementations, a record may also be created of where the data or content has been stored in operation 745 to allow a user to later request a list or report of all geographic locations where their data or content has been stored. If such request is received, all records of geographic locations where the user's data or content has been stored may be provided to the user.

If the content type of the previously stored user content is determined to not match the content type associated with the second target geographic storage location (NO) in 735, process 700 continues to operation 750. In operation 750, the previously stored content or data is moved to any available storage location because the system has determined that no target geographic specification has been provided by the user for content having a content type matching the content type of the content or data previously stored. In some implementations, the received content may be stored to a default storage location specified by the user, or may be stored to a default storage location selected by the service provider. In other embodiments, the current storage location may be maintained and the data or content may not be moved at all. Once the user content or data is stored to a storage location in operation 750, process 700 is terminated. Again, in some example implementations, a record may also be created of where the data or content has been stored in operation 650 to allow a user to later request a list or report of all geographic locations where their data or content has been stored. If such request is received, all records of geographic locations where the user's data or content has been stored may be provided to the user.

In some examples, processes 200, 300, 400, 500, 600 and 700 may be implemented with different, fewer, or more blocks. Process 200, 300, 400, 500, 600 and 700 may be implemented as computer executable instructions, which can be stored on a medium, loaded onto one or more processors of one or more computing devices, and executed as a computer-implemented method.

Figure 8:
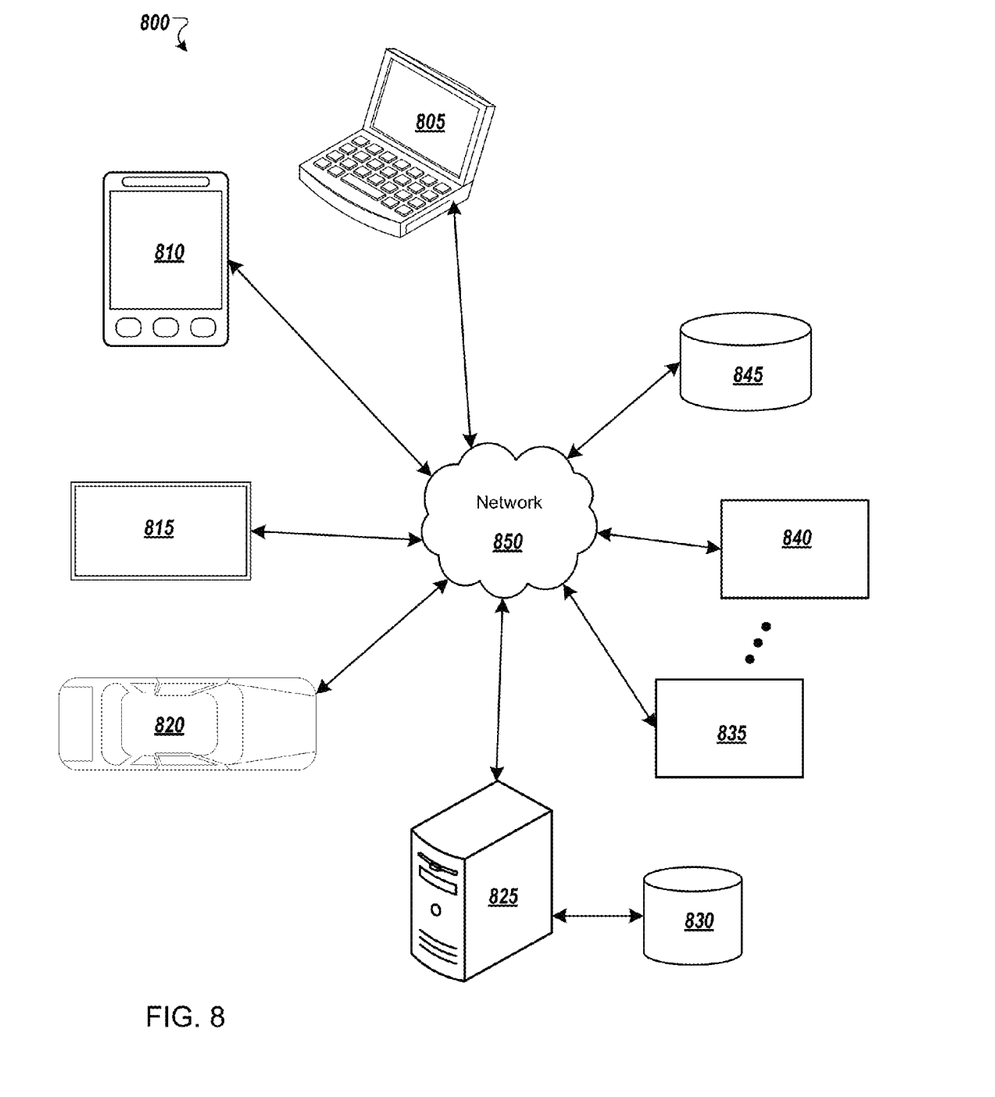
FIG. 8 shows an example environment suitable for some example implementations.

FIG. 8 shows an example environment suitable for some example implementations. Environment 800 includes devices 805-845, and each is communicatively connected to at least one other device via, for example, network 860 (e.g., by wired and/or wireless connections). Some devices may be communicatively connected to one or more storage devices 830 and 845.

An example of one or more devices 805-845 may be computing device 905 described below in FIG. 9. Devices 805-845 may include, but are not limited to, a computer 805 (e.g., a laptop computing device), a mobile device 810 (e.g., smartphone or tablet), a television 815, a device associated with a vehicle 820, a server computer 825, computing devices 835-840, storage devices 830 and 845.

In some implementations, devices 805-820 may be considered user devices (e.g., devices used by users to access services and/or issue requests, such as on a social network). Devices 825-845 may be devices associated with service providers (e.g., used by service providers to provide services and/or store data, such as webpages, text, text portions, images, image portions, audios, audio segments, videos, video segments, and/or information thereabout).

For example, a user (e.g., Alice) may access, view, generate and/or share content to be stored by the service provide using user device 805 or 810 on a social network supported by one or more devices 825-845. Alice may also may access and/or view her stored content or data using device 815 or 820.

Figure 9:
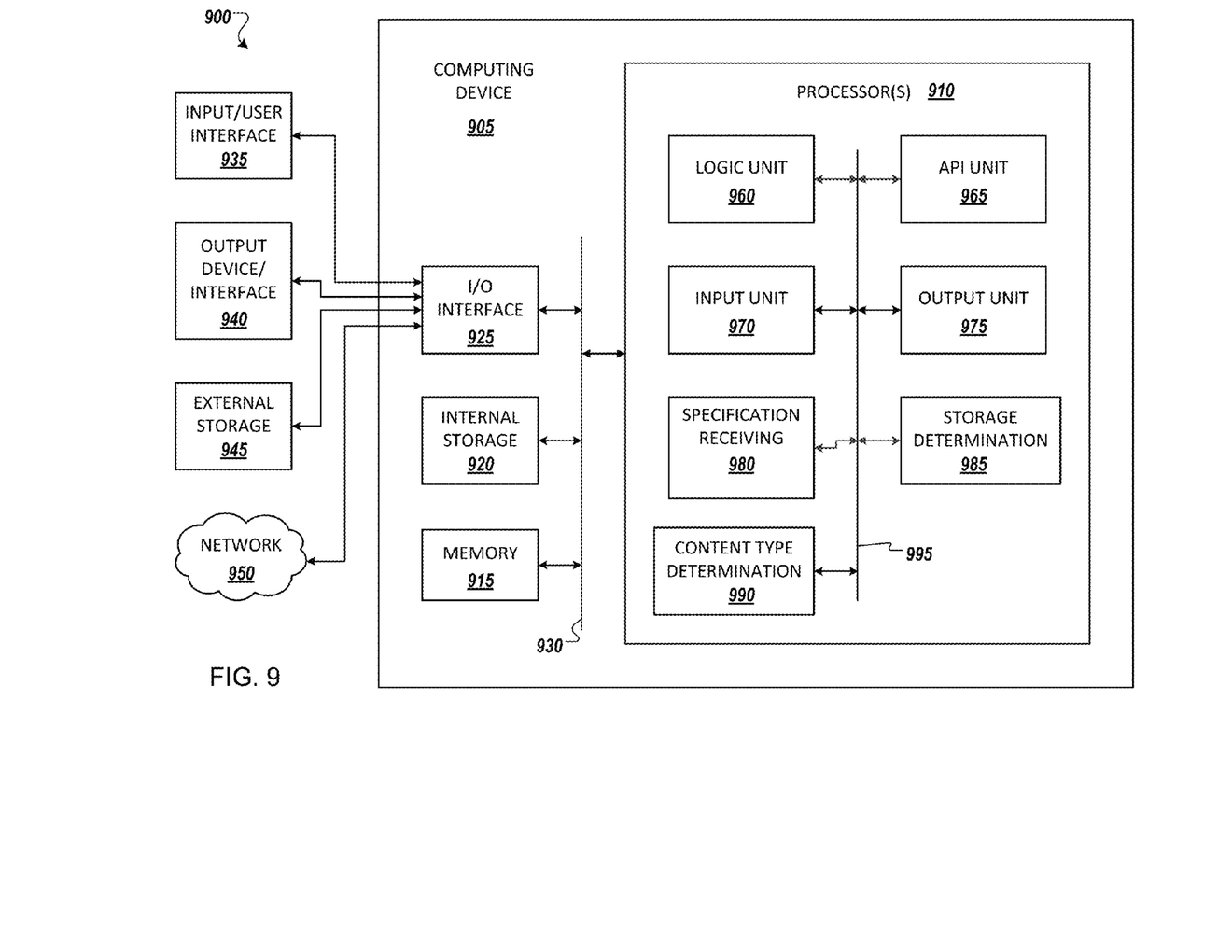
FIG. 9 shows an example computing environment with an example computing device suitable for use in some example implementations.

FIG. 9 shows an example computing environment with an example computing device suitable for use in some example implementations. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computing device 605.

Computing device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computing device 905. In other example implementations, other computing devices may function as or provide the functions of input/user interface 935 and output device/interface 940 for a computing device 605.

Examples of computing device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 905 can be communicatively coupled (e.g., via I/O interface 925) to external storage 945 and network 950 for communicating with any number of networked components, devices, and systems, including one or more computing devices of the same or different configuration. Computing device 905 or any connected computing device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computing device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, specification receiving unit 980, storage determination unit 985, content type determination unit 990, and inter-unit communication mechanism 995 for the different units to communicate with each other, with the OS, and with other applications (not shown). For example, specification receiving unit 980, storage determination unit 985, and content type determination unit 990 may implement one or more processes shown in FIGS. 2-7. The described units and elements can be varied in design, function, configuration, or implementation and are not limited to the descriptions provided.

In some example implementations, when information or an execution instruction is received by API unit 965, it may be communicated to one or more other units (e.g., logic unit 960, input unit 970, output unit 975, specification receiving unit 980, storage determination unit 985, and content type determination unit 990). For example, the specification receiving unit 980 may receive first and second target geographic specifications, each associated with a first content type and a second content type respectively from a user input with the input unit 970 using the API unit 965. Additionally, after the input unit 970 has detected user content has been received, the input unit 970 may use API unit 965 to communicate the user content to the content type determining unit 990 so that the content type may be determined. Further, the received first and second target geographic specifications received by the specification receiving unit 980 and the content type determined by the content type determination unity 990 may be communicated to the storage determination unity 985 using the API unit 965. Once the storage determination unit 980 makes a geographic storage location, the storage determination unit 980 may instruct that the user content be stored to external storage 945 located in the determined geographic storage location using the API unit 965.

In some instances, logic unit 960 may be configured to control the information flow among the units and direct the services provided by API unit 965, input unit 970, output unit 975, specification receiving unit 980, storage determination unit 985, and content type determination unit 990 in some example implementations described above. For example, the flow of one or more processes or implementations may be controlled by logic unit 960 alone or in conjunction with API unit 965.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method for determining a geographic location to store user content, the method comprising:
   determining a content type of the user content received from a user via one or more computing devices by analyzing at least one of metadata, a file name or extension, and embedded data associated with the user content;
   determining whether the determined content type matches a first content type associated with a first target geographic specification;
   storing the user content only in a first storage device located at a first geographic storage location in response to the first target geographic specification determined by the user prior to generation of the user content, based on the determining that the determined content type matches the first content type associated with the first target geographic specification;
   if the determined content type does not match the first content type, determining whether the determined content type matches a second content type associated with a second target geographic specification;
   storing the user content only in a second storage device located at a second geographic storage location in response to the second target geographic specification provided by the user prior to generation of the user content, based on the determining that the determined content type matches the second content type associated with the second target geographic specification;
   determining whether the determined content type does not match the first content type associated with the first target geographic specification and the second content type associated with the second target geographic specification; and
   storing the user content at a third storage device that is not at the first geographic storage location or the second geographic storage location, based on the determining that the determined content type does not match the first content type associated with the first target geographic specification and the second content type associated with the second target geographic specification.

2. The method of claim 1, wherein the first geographic location does not match the first target geographic specification; and
   wherein the second geographic location does not match the second target geographic specification.

3. The method of claim 1, wherein the first geographic location matches the first target geographic specification; and
   wherein the second geographic location matches the second target geographic specification.

4. The method of claim 1, further comprising creating one or more records of the geographic location where the user content has been stored;
   receiving a request for content storage history from the user; and
   displaying all records of geographic locations where the user content has been stored.

5. A computer-implemented method for determining a geographic storage location to store previously stored user content, the method comprising:
   determining a content type by analyzing at least one of metadata, a file name or extension, and embedded data associated with the user content and determining a current storage location of the user content previously stored via one or more computing devices;
   determining whether the determined content type matches a first content type associated with a first target geographic specification;
   storing the user content only in a first storage device located at a first geographic storage location in response to the first target geographic specification determined by the user prior to generation of the user content, based on the determining that the determined content type matches the first content type associated with the first target geographic specification, and removing the content from the current storage location;
   if the determined content toe does not match the first content type, determining whether the determined content type matches a second content type associated with a second target geographic specification;
   storing the user content only in a first storage device located at a second geographic storage location in response to the second target geographic specification determined by the user prior to generation of the user content, based on the determining that the determined content type matches the second content type associated with the second target geographic specification, and removing the content from the current storage location;
   determining whether the determined content type does not match the first content type associated with the first target geographic specification and the second content type associated with the second target geographic specification; and
   storing the user content at a third storage device that is not at the first geographic storage location or the second geographic storage location, based on the determining that the determined content type does not match the first content type associated with the first target geographic specification and the second content type associated with the second target geographic specification.

6. The method of claim 5, wherein the first geographic location does not match the current storage location when the current storage location matches the first target geographic specification and the content type of the previously stored user content matches the associated first content type; and
   wherein the second geographic location is determined to not match the current storage location when the current storage location matches the second target geographic specification and the content type of the previously stored user content matches the associated second content type.

7. The method of claim 5, wherein the first geographic location matches the first target geographic specification when the current storage location does not match the first target geographic specification and the content type of the previously stored user content matches the associated first content type; and
   wherein the second geographic location matches the second target geographic specification when the current storage location does not match the second target geographic specification and the content type of the previously stored user content matches the associated second content type.

8. A non-transitory computer readable medium having stored therein computer executable instructions for:
   determining a content type of user content received from a user via one or more computing devices by analyzing at least one of metadata, a file name or extension, and embedded data associated with the user content;
   determining whether the determined content type matches a first content type associated with a first target geographic specification;

storing the user content only in a first storage device located at a first geographic storage location in response to the first target geographic specification determined by the user prior to generation of the user content, based on the determining that the determined content type matches the first content type associated with the first target geographic specification;

if the determined content type does not match the first content type, determining whether the determined content type matches a second content type associated with a second target geographic specification;

storing the user content only in a second storage device located at a second geographic storage location in response to the second target geographic specification provided by the user prior to generation of the user content, based on the determining that the determined content type matches the second content type associated with the second target geographic specification;

determining whether the determined content type does not match the first content type associated with the first target geographic specification and the second content type associated with the second target geographic specification; and storing the user content at a third storage device that is not at the first geographic storage location or the second geographic storage location, based on the determining that the determined content type does not match the first content type associated with the first target geographic specification and the second content type associated with the second target geographic specification.

9. The non-transitory computer readable medium of claim 8, wherein the first geographic location does not match the first target geographic specification; and wherein the second geographic location does not match the second target geographic specification.

10. The non-transitory computer readable medium of claim 8, wherein the first geographic location matches the first target geographic specification; and wherein the second geographic location matches the second target geographic specification.

11. The non-transitory computer readable medium of claim 8, further comprising creating one or more records of the geographic location where the user content has been stored;

receiving a request for content storage history from the user; and displaying all records of geographic locations where the user content has been stored.

12. A non-transitory computer readable medium having stored therein computer executable instructions for:

determining a content type by analyzing at least one of metadata, a file name or extension, and embedded data associated with the user content and determining a current storage location of user content previously stored via one or more computing devices;

determining whether the determined content type matches a first content type associated with a first target geographic specification;

storing the user content only in a first storage device located at a first geographic storage location in response to the first target geographic specification determined by the user prior to generation of the user content, based on the determining that the determined content type matches the first content type associated with the first target geographic specification, and removing the content from the current storage location;

if the determined content type does not match the first content type, determining whether the determined content type matches a second content type associated with a second target geographic specification;

storing the user content only in a first storage device located at a second geographic storage location in response to the second target geographic specification determined by the user prior to generation of the user content, based on the determining that the determined content type matches the second content type associated with the second target geographic specification, and removing the content from the current storage location;

determining whether the determined content type does not match the first content type associated with the first target geographic specification and the second content type associated with the second target geographic specification; and storing the user content at a third storage device that is not at the first geographic storage location or the second geographic storage location, based on the determining that the determined content type does not match the first content type associated with the first target geographic specification and the second content type associated with the second target geographic specification.

13. The non-transitory computer readable medium of claim 12, wherein the first geographic location does not match the current storage location when the current storage location matches the first target geographic specification and the content type of the previously stored user content matches the associated first content type; and wherein the second geographic location does not match the current storage location when the current storage location matches the second target geographic specification and the content type of the previously stored user content matches the associated second content type.

14. The non-transitory computer readable medium of claim 12, wherein the first geographic location matches the first target geographic specification when the current storage location does not match the first target geographic specification and the content type of the previously stored user content matches the associated first content type; and wherein the second geographic location matches the second target geographic specification when the current storage location does not match the second target geographic specification and the content type of the previously stored user content matches the associated second content type.

* * * * *